United States Patent [19]

Pederson et al.

[11] 4,190,543
[45] Feb. 26, 1980

[54] WASTE WATER TREATMENT APPARATUS

[76] Inventors: Jerard M. Pederson, 3502 Clifton Ave., Cincinnati, Ohio 45220; William J. Beckman, Jr., 1722 Fireside Dr., Cincinnati, Ohio 45230

[21] Appl. No.: 926,073

[22] Filed: Jul. 19, 1978

[51] Int. Cl.² ............................................. B01D 29/04
[52] U.S. Cl. .................................. 210/332; 210/335; 210/347; 210/499
[58] Field of Search ................. 210/17, 150, 151, 499, 210/332, 334, 335, 346, 347

[56] References Cited

U.S. PATENT DOCUMENTS

| | | | |
|---|---|---|---|
| 2,480,320 | 8/1949 | Carrier | 210/332 X |
| 3,104,222 | 9/1963 | Fuehring | 210/335 X |
| 3,227,429 | 1/1966 | Renzi | 210/150 X |
| 3,607,104 | 9/1971 | Blickle et al. | 210/332 X |
| 3,750,887 | 8/1973 | Carlson | 210/150 |
| 3,764,525 | 10/1973 | Goodman et al. | 210/499 X |
| 3,925,205 | 12/1975 | Sparham | 210/73 |
| 4,002,540 | 1/1977 | Bixby | 204/24 |
| 4,039,437 | 8/1977 | Smith et al. | 210/17 X |
| 4,045,344 | 8/1977 | Yokota | 210/151 X |

FOREIGN PATENT DOCUMENTS 881668  9/1971  Canada .

*Primary Examiner*—Thomas G. Wyse
*Attorney, Agent, or Firm*—Wood, Herron & Evans

[57] ABSTRACT

Disclosed herein is a waste water treatment apparatus and process especially adapted for tertiary treatment of sewage wherein a plurality of biological media panels are positioned in a treatment tank in a manner such that the formation of a stable mat or film composed of solids is established thereon. Biological growth on the panels is enhanced while at the same time excessive solids build-up is avoided. Flow through the tank is directed in a generally horizontal fashion and sludge removal is accomplished by pump means.

6 Claims, 5 Drawing Figures

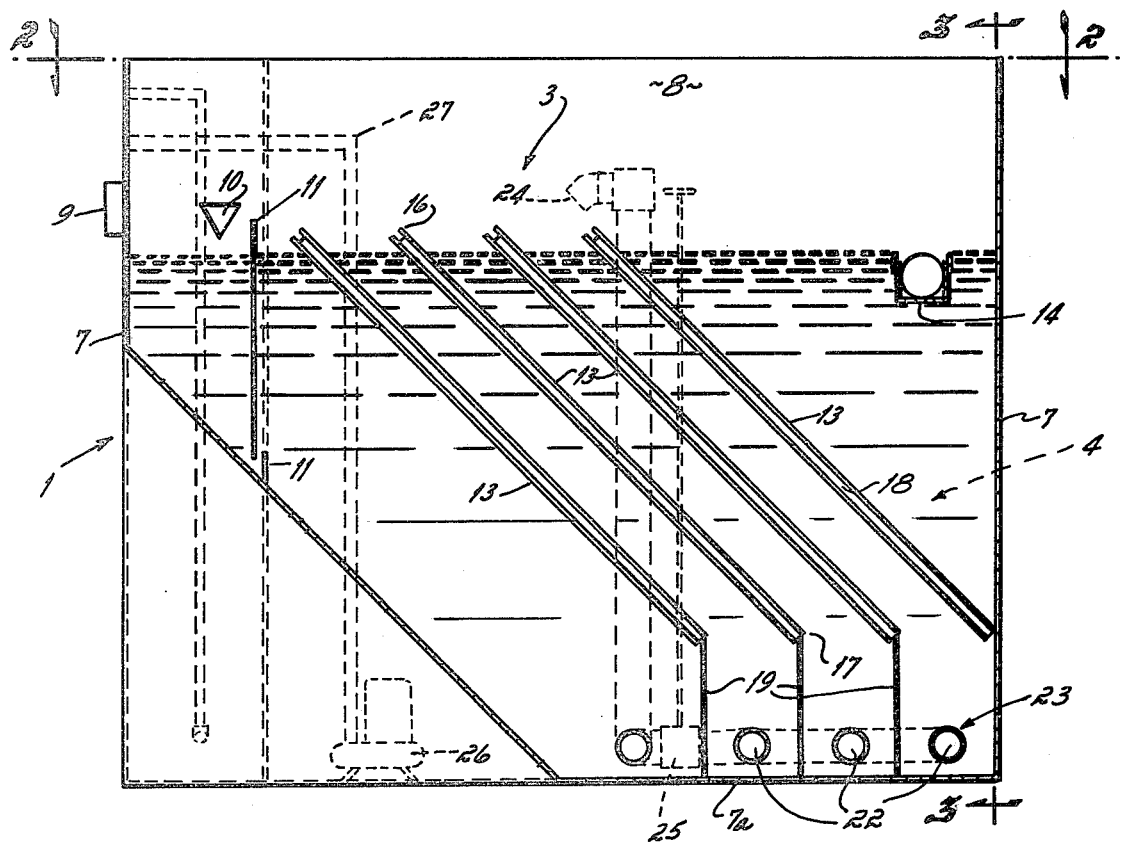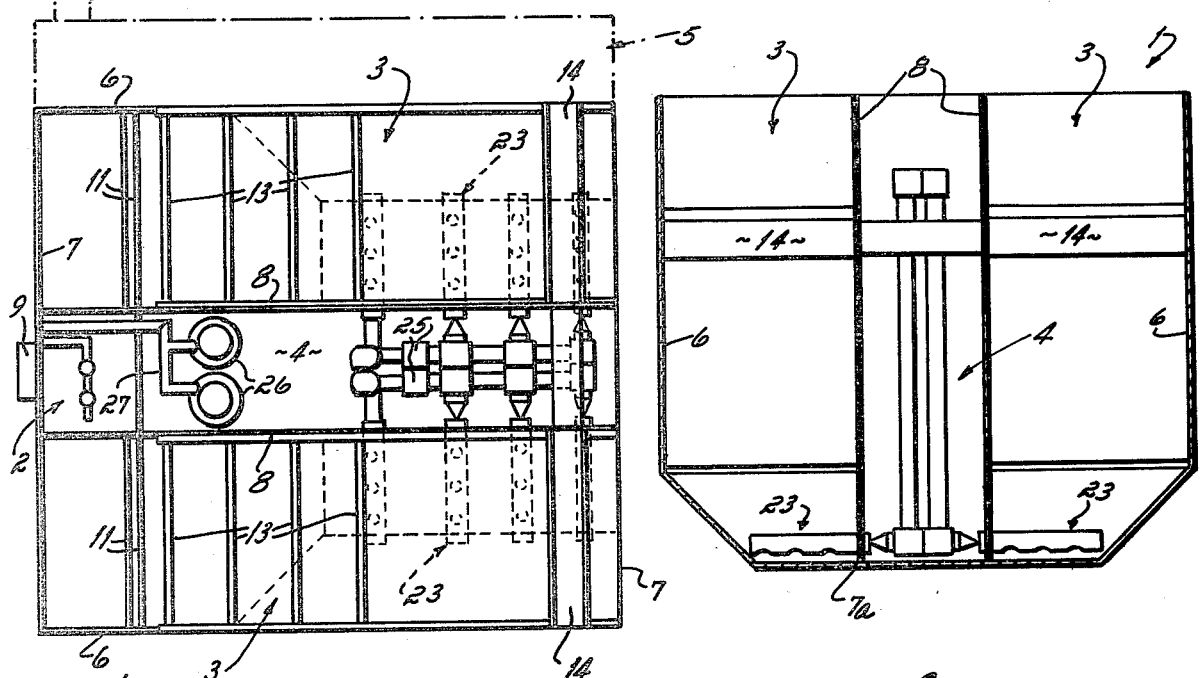

WASTE WATER TREATMENT APPARATUS

BACKGROUND OF THE INVENTION

It is recognized in the art that sewage treatment processes are generally comprised of three distinct treatment steps. Such are referred to as primary, secondary and tertiary treatments.

Current discharge requirements for treated waste water, especially from sewage treatment plants, generally call for a degree of suspended solids removal unattainable by secondary treatment technology on a predictable and uniform basis. For example, the standards currently applicable in Ohio are 8 mg/L monthly average and 12 mg/L maximum weekly average. Various types of tertiary treatment techniques and devices have been employed such as slow sand filtration, rapid gravity sand filtration, spray irrigation and polishing lagoons. Prior art patents have disclosed various tertiary treatment as well as apparatus for other treatment methods, as for example: U.S. Pat. No. 1,969,022; U.S. Pat. No. Re. 21,652; U.S. Pat. Nos. 3,774,770; 3,864,264; 3,923,649; and 3,925,205. Known prior art tertiary treatment apparatus is characterized by one or more of the following:

(A) Treatment is accomplished by mechanical-physical separation means which cause precipitation of the suspended solids as a sludge;

(B) Sludge removal is accomplished by scraping means;

(C) Sludge build-up on the filtering means is taught to be undesirable and to be avoided;

(D) Periodically the filtering means must be backwashed; and (E) Upward flow of the to-be-treated waste is commonly sought.

The principal objectives of the present invention have been to provide a treatment process and apparatus wherein the principal treatment is accomplished by a biological filter mat dependent on solids build-up on and adjacent to biological media panels; wherein sludge may be removed with pump and air lift means and scraping means are not provided; wherein backwashing is not required; and wherein horizontal flow of the treated waste water through the panels is established.

SUMMARY OF THE INVENTION

It has been found that excellent solids removal may be obtained by introducing the waste water to be treated, especially sewage from a secondary treatment facility, into a tank having a plurality of spaced apart biological media panels. Obviously, other types of waste water may be similarly treated. The waste water flows in a generally horizontal path through the media panels to a discharge outlet. After initial start-up and as operation continues, solids are deposited on and adjacent to the biological media panels forming a biological filter or mat which significantly increases the solids removal of the device and contributes substantially to the effectiveness of the unit. The biological media panels are preferably inclined so that unnecessary and unbeneficial solids deposits do not accumulate thereon but rather slide off and are deposited on the bottom of the tank adjacent to ports in an air lift header system which may be activated for the purpose of removing the sludge when such removal is required.

Solids removal is initially effected with the establishment of a stable biological mat on and adjacent to the biological media panels. Filtration is then effected by the biological mat. The process is not substantially dependent upon flocculation and precipitation by compression settling. As will be more apparent hereinafter, solids removal by the use of the herein described invention is excellent and enables a user to meet present-day standards.

In comparison to some prior art devices where a throughput of 500 gallons per day per square foot of screen area is considered about a maximum, the present invention permits a loading about $2\frac{1}{2}$ times greater without attendant significant solids removal reduction. Obviously, such enables smaller and less costly equipment to be utilized and/or to better handle upset conditions.

The ease with which sludge may be removed, the elimination of scraping mechanisms, and the absence of the need to periodically backwash the media panels, contribute greatly to the simplified operation and maintenance of the present invention and in addition to the foregoing described advantages provide an improved tertiary treatment step.

DETAILED DESCRIPTION OF THE INVENTION

Following is a description of the invention with reference to the accompanying diagrammatic drawings, in which:

FIG. 1 is a cross-sectional view of a rectangular biological filtration tank provided with optional head-end flocculation chamber and optional discharge disinfection chamber;

FIG. 2 is a plan view of the tank taken on line 2—2 of FIG. 1;

FIG. 3 is a section on the line 3—3 of FIG. 1;

Figure 4:
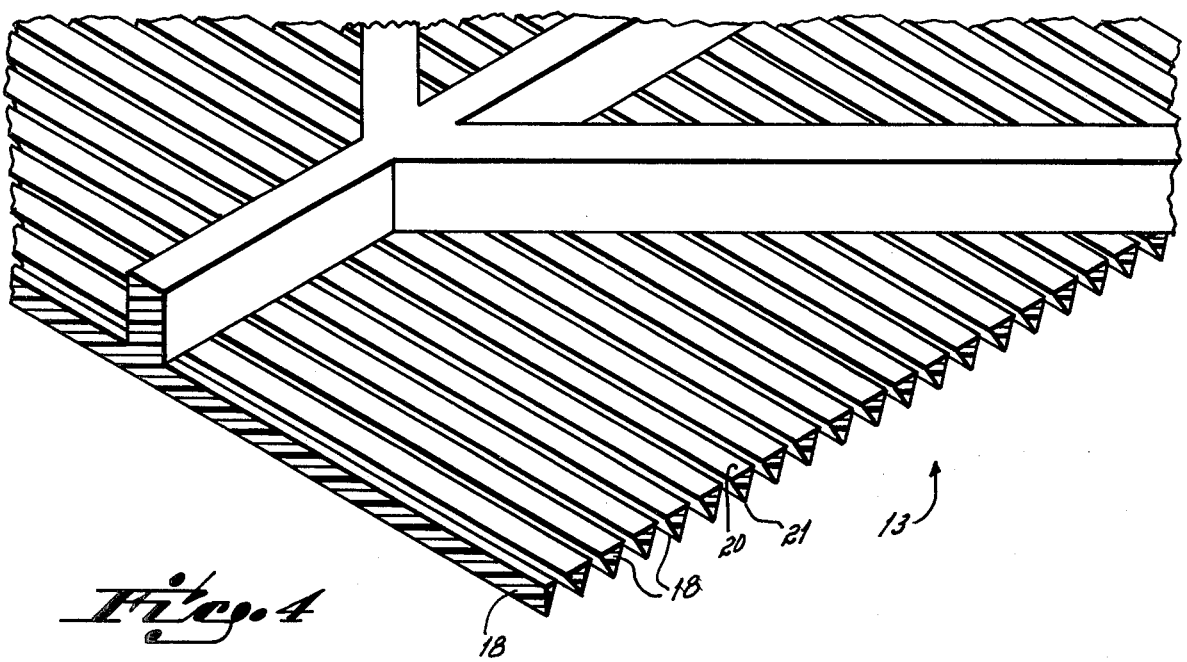
FIG. 4 is an enlarged fragmentary perspective of the media panel gridwork used in the filtration cell.

Referring to FIGS. 1-3, there is shown there the preferred embodiment of our invention comprising a generally rectangular (in plan view) concrete or steel biological filtration tank 1 having separate flocculation 2, filtration 3, sludge removal 4, and disinfection 5, chambers or cells. The tank 1 has external side walls 6, end walls 7, a bottom wall 7a and internal longitudinal walls 8. Such walls provide and define the heretofore mentioned slude removal chamber 4 and filtration chambers 3 and part of the walls forming the flocculation 2 and disinfection 5 chambers.

The tank 1 is provided at one end with an influent pipe 9 through which waste water to be treated is introduced first to the optional flocculation chamber 2. Here, if desired, certain chemicals which enhance the flocculating characteristics of the suspended solids in the influent waste water may be added. Such agents are well known in the art. Following the addition of the flocculation agent, if employed, the liquid flow is split into two equal streams by two V-notch weirs 10 and fed to each of two filtration cells 3, parallel to each other, by passage beneath two underflow stilling baffles 11. Some solids settle at this point in the process to the bottom of the two cells 3. A steadily decreasing hydraulic head extends from the tank's inlet 9 through each of four inclined media panels 13 contained in each sedimentation filtration cell 3. Ultimately the liquid reaches an effluent trough 14 where the resultant filtered and clarified liquid is transported via said trough 14 across the downstream end of both cells 3 and discharged to an optional disinfection chamber 5 where various bacteriocidal materials may be administered, if desired, prior to ultimate discharge. Thereafter the effluent proceeds out of chamber 5 through outlet 15 and may be disposed of.

As noted hereinbefore, the rectangular tank 1 is longitudinally divided by two parallel vertical internal walls 8 so as to form two identical and parallel filtration cells 3 and a sludge removal cell 4 therebetween. Two cells 3 are preferred from a maintenance standpoint but such number can be varied; in fact, for certain applications one cell may be sufficient.

Each filtration cell 3 includes several inclined media panels 13. Such panels 13 are preferably slanted at a vertical angle of about 45°. Depending upon the particular characteristics of the waste water, this angle may be varied. The tops 16 of panels 13 face the inlet end of the tank 1 and the bottoms 17 of panels 13 face the outlet of the tank 1, as shown in FIG. 1. As best shown in FIG. 4, the media panels preferably comprise a plastic or steel gridwork consisting of a plurality of parallel bars 18. When the panel 13 is in place, the bars 18 extend from top to bottom across the entire width of the cell 3. The media panels 13 are secured to the internal walls 8 and external walls 6 by means, not shown, which permit their removal for periodic cleaning and/or replacement.

The number of media panels 13 used in each cell 3 may vary with the particular circumstances, but it is believed the most efficient operation will include four of such panels 13 in each filtration cell 3. The required amount of media panel surface area may be easily calculated. The maximum number of square feet required is equal to the daily flow rate in gallons divided by 500. The minimum number of square feet required is equal to the daily flow rate in gallons divided by 1,250. These are approximate values and deviations can be used depending on the particular circumstances.

Each panel 13 does not extend to the bottom of each cell but rather stops short thereof and rests against a solid non-perforated bulkhead 19. Each panel 13 extends to the surface of the waste water. This arrangement insures that all of the waste water to be treated will pass through all of the media panels 13.

In the preferred form of our invention media panels 13 are plastic and the bars 18 thereof are triangular in cross section, as shown in FIG. 4. The panels 13 are positioned so that the bases 20 are on the top of the panel and the apexes 21 are on the bottom of the panel 13.

The media panel bars 18 are spaced apart about 0.50 mm and the distance from their base to their apex is about 2 mm. A suitable media panel (sometimes called wedge wire) is available in the industry from Johnson® Screens by UOP Inc. Such are frequently referred to as wedge wire panels.

The perforated media panels 13 are structured so as to promote the formation of colloidal biological filters of microscopic thickness on their downstream faces. These biological filters capture the ultrafine suspended solids in the influent liquid and contribute greatly to the production of increasingly higher degrees of filtration.

In the practice of the herein described process it is believed that three distinct forms of solid separation occur: (1) surface tension; (2) pressure differential; and (3) adsorption filtration. With reference to FIG. 1, these forms are believed to interact as follows. During heavy solids application the media panel 13 closest to the inlet 9 acts as added surface tension to the solids blanket which develops on the upstream side of said panel 13, some of which accumulates as sludge on the bottom of tank 1. Because the media panels 13 are inclined at approximately 45° the solids do not accumulate thereon to a point that efficient operation is impaired. At some point the solids fall from the panel 13 to the bottom wall 7a of the tank. In effect the panels 13 are self-cleaning.

As the waste water passes through the panels 13 it undergoes velocity increase and concurrent pressure decrease due to the narrowing of the passages through the panels due to the heretofore described triangular configuration of the bars 18. The low pressure zone on the downstream panel face establishes the biological filter mat. This cycle repeats at each panel. After passing through a media panel 13 velocity and pressure return to normal thus increasing the amount of solids precipitated. As a result precipitation is enhanced as the water passes through each panel 13, diminishing in quantity toward the outlet end of the tank 1.

The adsorption filtration process takes place when biological growth begins to cling to the bars 18 of the media panel 13. The first evidence will accrue on the media panel 13 adjacent to the inlet of the tank 1. This initial display is a result of the entering solids attaching themselves to the screen causing the screen to appear plugged.

With the passage of time the nutrients in the liquid will give rise to the attachment of a biological mass and attach itself to the screens of all stages. When this biological mass reaches maturity, the adsorption filtration system will be at its maximum performance efficiency. The mature biological mass removes the smaller solids particles by adsorption and explains in large part the improvement in filtration obtained. Once the adsorption filtration biological mass is established, the unit can be maintained at or near maximum efficiency due to natural cleaning ability of the panels 13 as described above.

The flow path of the waste water as it passes through the media panel 13 is substantially horizontal. Before the water has been discharged substantially all of it has passed through all of the media panels 13. The media panel 13 nearest to the influent pipe 9 causes the flow of waste water to be equally distributed across the area of each media panel 13. By establishing such a flow path, optimum conditions are provided and maintained for the establishment and maintenance of the adsorption-biological phenomenon sought.

As the operation of the process and apparatus continues a point is reached where the sludge that has accumulated at the bottom 7a of the tank 1 should be removed. This is accomplished by actuating the air lift pumps (of conventional design) by supplying air through air lines, not shown. Sludge is removed through ports 22 of a sludge removal header system 23 and exits the air lift pump outlet 24 and is deposited in the sludge chamber 4. Back water valves 25 prohibit a reverse flow into the cells 3. When the sludge-water level in sludge chamber 4 reaches a predetermined level, pumps 26 are activated and the sludge and water removed via lines 27. In certain applications such a sludge removal system may be eliminated.

In order to test the efficiency of our invention, a plastic tank 1 was fabricated with a flocculation chamber 2 and two filtration chambers 3, as hereinbefore described. The dimensions of each chamber 3 were about 12¼" wide and 44" long. A water depth of 23" was utilized. In each sedimentation chamber 3 four plastic media panels 13, as herein described, each about two square feet, were positioned at an angle of about 45°.

Figure 5:
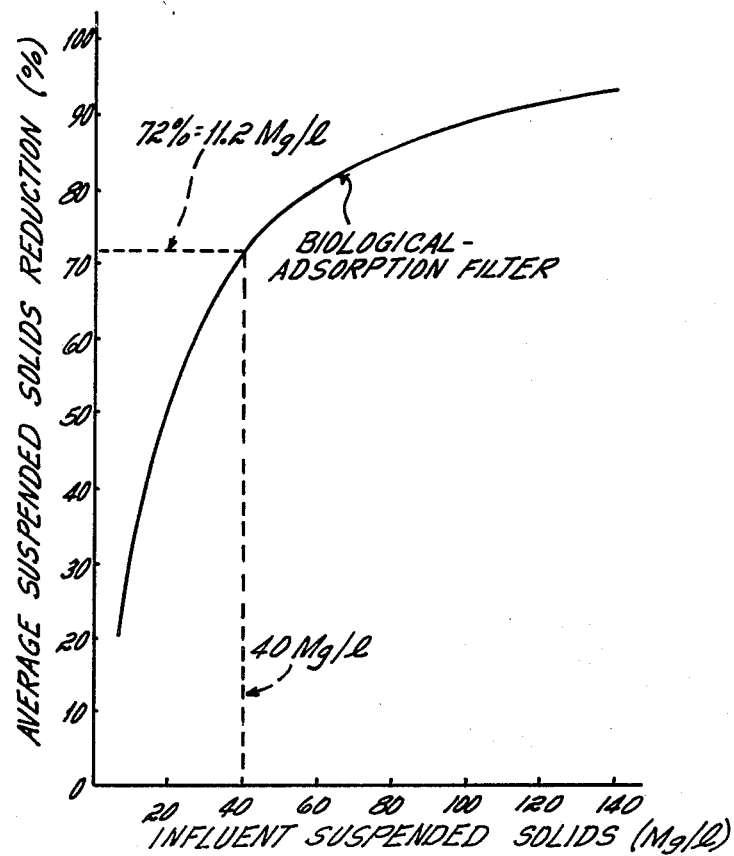
FIG. 5 is a performance graph of a biological-adsorption filter.

In one series of tests waste water from a rotary biological contactor system was introduced at a rate of 500 gallons per day per square foot of media panel. The waste water was introduced into the flocculation chamber 2. The results of the various tests performed are set forth in the graph of FIG. 5.

In order to test the herein described process wherein a substantial portion of the filtering is achieved by the biological mass variations in the apparatus were tested. For example, the four media panels 13 were rearranged such that several were positioned in very close proximity to one another. In one series of tests where the panels 13 were arranged such that the first three media panels were placed in close proximity to each other (about 2" apart) with the fourth (downstream side of first three) spaced farther apart, improved results were observed. It is believed that placing the media panels 13 in such close proximity helps to stabilize and maintain the biological mat or filter adjacent to the media panels. While four media panels 13 have been described, more or less could be employed. However, at least two should be employed.

Having thus described our invention, we claim:

1. Waste water treatment apparatus for removing suspended solids from waste water comprising in combination:
   at least one filtration chamber, said chamber having a plurality of walls including bottom and side walls, said filtration chamber also having waste water receiving and discharging means,
   a plurality of wedge wire media panels mounted within said filtration chamber, said panels having perforations therein through which the waste water is directed, said media panels extending from approximately the bottom wall of said filter chamber to the normal waste water surface level and extending between the side walls, and said media panels being inclined with respect to the vertical axis of the side walls such that the portion of the media panel adjacent to said bottom wall is closer to the discharging means than is the portion of the media panel adjacent to said waste water surface level, whereby a biological mat is established on and adjacent to the media panels so as to filter the solids by adsorption.

2. The waste water treatment apparatus of claim 1 wherein at least three media panels are used for each filter chamber.

3. The waste water treatment apparatus of claim 2 wherein two filtration chambers are employed.

4. The waste water treatment apparatus of claim 3 wherein the filtration chambers are parallel to one another and have a sludge removal cell therebetween.

5. The waste water treatment apparatus of claim 4 wherein sludge removal means are included in each filter chamber and such means are connected by pump means to the sludge removal cell.

6. Waste water treatment apparatus for removing solids from waste water comprising in combination:
   two filtration chambers, said chambers having a plurality of walls including a bottom wall, side walls, and front and rear walls,
   waste water receiving means in said front wall and waste water discharging means in said rear wall,
   a sludge removal cell interposed between said filtration chambers,
   sludge removal means in each filtration chamber, said removal means connected by pump means to the sludge removal cell, whereby accumulated sludge can be removed from said filtration chambers and transported to said sludge removal cell,
   four wedge wire media panels mounted in substantially parallel arrangement within said filtration chambers, said media panels extending from approximately the bottom wall of said filter chambers to the normal waste water level and extending between the side walls, said media panels being inclined with respect to the vertical axis of the side walls such that the portions of the media panel adjacent to said bottom walls are closer to the end wall than are the portions of the media panels adjacent to the front wall, and the distance between each of the three media panels closest to the front wall being about two inches.

* * * * *